US009858809B2

(12) United States Patent
Heckford et al.

(10) Patent No.: US 9,858,809 B2
(45) Date of Patent: Jan. 2, 2018

(54) AUGMENTING HANDSET SENSORS WITH CAR SENSORS

(71) Applicant: QUALCOMM Incorporated, San Diego, CA (US)

(72) Inventors: Andrew Charles Heckford, Cambridge (GB); Peter Andic, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 13/672,614

(22) Filed: Nov. 8, 2012

(65) Prior Publication Data
US 2014/0125489 A1 May 8, 2014

(51) Int. Cl.
G08C 19/16 (2006.01)
G08C 19/00 (2006.01)
H04L 29/08 (2006.01)
G07C 5/00 (2006.01)
G07C 5/08 (2006.01)
H04W 4/00 (2009.01)

(52) U.S. Cl.
CPC .............. *G08C 19/00* (2013.01); *H04L 67/12* (2013.01); *G07C 5/008* (2013.01); *G07C 5/0816* (2013.01); *H04W 4/005* (2013.01)

(58) Field of Classification Search
CPC ........ H04Q 9/00; A61B 5/0002; B60K 35/00; B60K 37/02; G07C 5/008
USPC .... 340/870.01, 438, 963, 905, 425.5, 870.3, 340/870.02, 426.11, 426.13; 701/29, 701/29.6, 36, 29.1, 31.4, 2, 469, 412, 1, 701/32.4, 117
See application file for complete search history.

(56) References Cited

U.S. PATENT DOCUMENTS

| 6,057,758 | A | * | 5/2000 | Dempsey | ................. | A61N 1/08 128/903 |
|---|---|---|---|---|---|---|
| 7,275,096 | B2 | | 9/2007 | Green | | |
| 7,346,891 | B2 | | 3/2008 | Anand et al. | | |
| 8,085,705 | B2 | | 12/2011 | Feher | | |
| 8,157,730 | B2 | * | 4/2012 | LeBoeuf | ................. | A61B 5/11 128/920 |
| 2003/0125851 | A1 | * | 7/2003 | Andreasen et al. | ............ | 701/29 |

(Continued)

OTHER PUBLICATIONS

Bose R., et al., "Morphing Smartphones into Automotive Application Platforms", Computer, IEEE, US, vol. 44, No. 5, May 1, 2011 (May 1, 2011), pp. 53-61.

(Continued)

*Primary Examiner* — Hoi Lau
(74) *Attorney, Agent, or Firm* — Kilpatrick Townsend & Stockton, LLP

(57) ABSTRACT

Methods, apparatuses, and computer programmable media for generating applications configured to access telemetry from at least one vehicle, the applications being generated by a consumer-programmable platform, are presented. The application may display data indicative of the vehicle telemetry or may allow a user to interface with the vehicle telemetry. Examples of vehicle telemetry may include data about the health and status of the vehicle, such as the current temperature of the vehicle engine or the current speed of the vehicle. Embodiments may generate applications configured to access telemetry from multiple vehicles built by different automobile manufacturers.

30 Claims, 19 Drawing Sheets

(56) References Cited

U.S. PATENT DOCUMENTS

| | | | |
|---|---|---|---|
| 2004/0032340 A1* | 2/2004 | Lingafeldt | H04M 11/002 340/870.02 |
| 2005/0156735 A1* | 7/2005 | Humphries | G06Q 10/08 340/539.13 |
| 2006/0155431 A1* | 7/2006 | Berg et al. | 701/2 |
| 2007/0156311 A1* | 7/2007 | Elcock et al. | 701/29 |
| 2007/0179692 A1* | 8/2007 | Smith | G06Q 10/06315 701/32.4 |
| 2009/0005930 A1* | 1/2009 | Koebrick | 701/36 |
| 2010/0052948 A1* | 3/2010 | Vian et al. | 340/963 |
| 2011/0082620 A1* | 4/2011 | Small | B60K 35/00 701/31.4 |
| 2011/0140871 A1* | 6/2011 | Christensen | B60R 25/04 340/426.11 |
| 2011/0184789 A1* | 7/2011 | Kirsch | 705/14.1 |
| 2011/0191787 A1 | 8/2011 | Poleg et al. | |
| 2011/0304444 A1* | 12/2011 | Zhang et al. | 340/425.5 |
| 2012/0015686 A1 | 1/2012 | Krupnik | |
| 2012/0065814 A1* | 3/2012 | Seok | 701/2 |
| 2012/0095643 A1* | 4/2012 | Bose et al. | 701/32.8 |
| 2012/0310445 A1* | 12/2012 | Hatton et al. | 701/2 |
| 2013/0194106 A1* | 8/2013 | Lee | A61N 1/37252 340/870.3 |
| 2014/0012494 A1* | 1/2014 | Cudak | G01C 21/3415 701/412 |
| 2014/0100716 A1* | 4/2014 | Kawai et al. | 701/2 |

OTHER PUBLICATIONS

International Search Report and Written Opinion—PCT/US2013/065455—ISA/EPO—Jan. 16, 2014.

Simonds C., "Transportation IT—Software for the Next-Generation Automobile", IT Professional, IEEE Service Center, Los Alamitos, CA, US, vol. 5, No. 6, Nov. 1, 2003 (Nov. 1, 2003), pp. 7-11.

Yun D.S., et al., "Development of Mobile Common Component for Providing Vehicle Information on Mobile Device", Nov. 29, 2011 (Nov. 29, 2011), Computer Sciences and Convergence Information Technology (ICCIT), 2011 6th International Conference on, IEEE, p. 809-812.

\* cited by examiner

```
/**
 * Example 1: Accessing a vehicle's rear parking/proximity sensor
 **/

// Get an instance of the RearProximitySensorManager to access the automobile's
// rear parking sensor
RearProximitySensorManager rpsm = (RearProximitySensorManager) getAutomobileService(AutomobileService.PROXIMITY_SENSOR_REAR);

// Do a one-time 'ping' of the rear parking sensor to get the distance of
// the object behind the vehicle.
double currentDistance = rpsm.getDistance();

if (distance > -1) {
    Log.v("My app","vehicle behind is : " + distance + " meters");
}
else {
    Log.v("My app", "No vehicle detected behind");
}

// Set up a proximity alert using the rear parking sensor
// when an object is detected within 2.0 meters of the vehicle
// the code in pendingIntent is executed.
Intent intent = new Intent(this, MyBroadcastReceiver.class);
PendingIntent pendingIntent = PendingIntent.getBroadcast(this.getApplicationContext(), 100, intent, 0);
double distance = 2.0; //Distance in meters
int expire = 1000; // Expiry time in milliseconds
rpsm.addProximityAlert(distance, expire, pendingIntent);
```

*FIG. 6A*

```
/**
 * Example 2: Accessing a vehicle's engine management service
 * to detect when the vehicle is in motion and disable distracting
 * features on the user's handset such as SMS.
 */

// Get an instance of the EngineManagementService to access engine management
// telemetry
EngineManagementService ems = (EngineManagementService) getAutomobileService(AutomobileService.ENGINE_MANAGEMENT);

// Set up an alert to monitor motion of the vehicle
// once the motion is over a certain speed the code in
// vehiclemovingIntent is executed. This could put the
// handset into a car-mode restricting access to certain
// distracting features on the handset like SMS.

int speed = 10; // Speed in mph

Intent intent = new Intent(this, MyBroadcastReceiver.class);
pendingIntent vehiclemovingintent = pendingIntent.getBroadcast(this.getApplicationContext(), 100, intent, 0);
ems.addVehicleMotionAlert(speed, expire, vehiclemovingintent);
```

*FIG. 6B*

```
/**
 * Example 3: Accessing a vehicle's engine management service
 * to automatically trigger an internet search on the user's mobile phone for the
 * nearest fuel station when the fuel level drops below the reserve line.
 */

// Get an instance of the EngineManagementService to access engine management
// telemetry
EngineManagementService ems = (EngineManagementService) getAutomobileService(AutomobileService.ENGINE_MANAGEMENT);

// Get current vehicle range in miles
int range = ems.getRange();

// Get miles per gallon
int cmpg = ems.getCurrentMpg();
int ampg = ems.getAverageMpg();

// Set up an alert to monitor the level in the fuel tank
// when the level drops into the reserve tank the code in
// findFuelStationIntent is executed. This code could search the internet
// for the nearest fuel station and present a list of stations nearby
// to the user.
Intent intent = new Intent(this, MyBroadcastReceiver.class);
PendingIntent findFuelStationIntent = PendingIntent.getBroadcast(this.getApplicationContext(), 100, intent, 0);
ems.addReserveFuelTankAlert(expire, findFuelStationIntent);
```

*FIG. 6C*

```
/**
 * Example 4: Accessing a vehicle's eye tracking camera
 * to detect when a driver becomes fatigued and log the event. This
 * could be used to build an app used by freight and haulage companies
 * to monitor how often their employees are driving in a fatigued state.
 */

// Get an instance of the DriverFatigueDetectionService which uses the
// automobile's eye tracker to monitor driver fatigue
DriverFatigueDetectionservice dfds = (DriverFatigueDetectionService) getAutomobileservice(Automobileservice.DRIVER_FATIGUE);

// Not all vehicles have eye tracking so test to see if the service is
// available on the vehicle currently connected to the handset before proceeding
// any further.
if (dfds == null) {
    Toast.makeText(getApplicationContext(), "vehicle does not have driver eye tracking", Toast.LENGTH_SHORT).show();
    exit;
}

// Set up a listener to monitor for driver fatigue
// whenever driver fatigue is detected the code in the listener class
// is executed logging the event.
dfds.setDriverFatigueDetectionListener(new DriverFatigueDetectionListener() {
    DriverFatigueLog.log(System.currentTimeMillis());
});
```

*FIG. 6D*

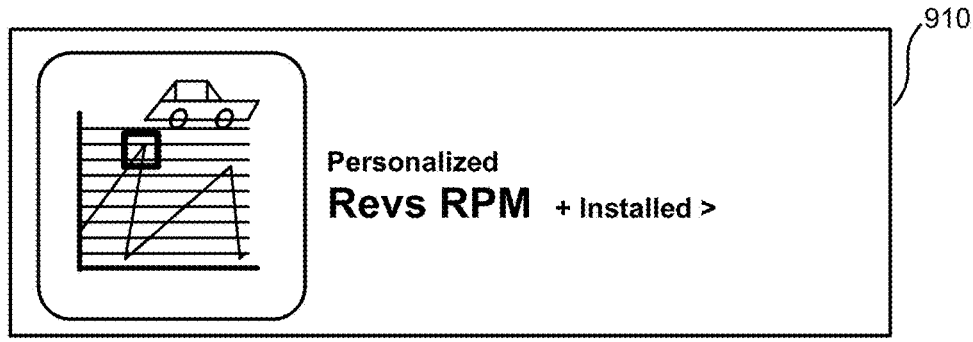
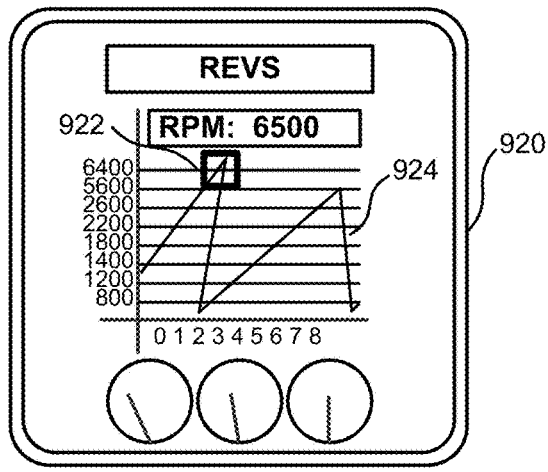
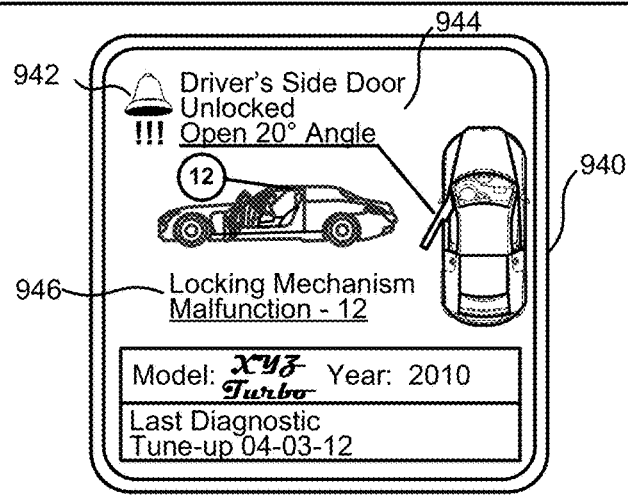
FIG. 9

AUGMENTING HANDSET SENSORS WITH CAR SENSORS

BACKGROUND OF THE INVENTION

Some automobiles have electronic displays capable of interfacing with electronic features in the automobiles. While many of these features are more readily available in luxury car models, other features may become more standard for models of the average customer over time. It may thus be anticipated that digital and electronic functionality within and pertaining to automobiles may be more prevalent in the future.

SUMMARY OF THE INVENTION

Methods and apparatuses for generating applications configured to access telemetry from at least one vehicle, the applications being generated by a consumer-programmable platform, are presented. The application may display data indicative of the vehicle telemetry or may allow a user to interface with the vehicle telemetry. Examples of vehicle telemetry may include data about the health and status of the vehicle, such as the current temperature of the vehicle engine or the current speed of the vehicle. Embodiments may generate applications configured to access telemetry from multiple vehicles built by different automobile manufacturers.

Some embodiments may include interfacing with a vehicle by the device, determining, by the device, what type of vehicle is being interfaced with. Embodiments may also receive, at the device, sensor data indicative of vehicle telemetry from the vehicle. Embodiments may also generate, at the device, the application, utilizing the sensor data and being derived from an application program interface platform, and display the application on an output device. The device may be a mobile device or a personal computer, for example.

Some embodiments may include a receiver, adaptable to receive first sensor data indicative of first vehicle telemetry from the first vehicle and second sensor data indicative of second vehicle telemetry from the second vehicle, the first vehicle and second vehicle being distinct vehicles. Embodiments may also include an application program interface, adaptable to access the first sensor data and second sensor data, and to generate at least one application utilizing the first sensor data or second sensor data. Embodiments may also include a display interface, adaptable to display the at least one application.

Some embodiments may include generating at least one application configured to utilize first sensor data indicative of first vehicle telemetry from a first vehicle and second sensor data indicative of second vehicle telemetry from a second vehicle, the first vehicle and second vehicle being distinct vehicles. Embodiments may also include interfacing the at least one application with the first vehicle, receiving at the at least one application the first sensor data, and operating the at least one application using the received first sensor data.

In some embodiments, the application generated by the application program interface may direct the mobile device to transmit data to another mobile device, access point, base station, or server. In some embodiments the application may direct the mobile device to retrieve data from the Internet. In some embodiments, the application may determine at least one command to send to the vehicle using the sensor data, and may send the at least one command to the vehicle.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 6A-6D are example sets of pseudocode implementing some embodiments.

FIG. 9 illustrates multi-level interfaces of some example applications that may be created by some embodiments.

DETAILED DESCRIPTION

Apparatuses and methods for generating an application utilizing sensor data from multiple automobiles, the application being generated by a consumer-programmable application program interface platform, are presented. Automobiles, often viewed as mechanical devices, are quickly becoming more and more integrated with electrical interfaces and components. Automobile manufacturers are finding new and creative ways to equip automobiles with software applications, voice controls, touch screens, and the like.

Many of these features may be considered merely luxuries, but some features may provide very helpful diagnostic tools for assessing the health and safety of the vehicle. Automobiles may be equipped with sensors and data monitors to access automobile telemetry, and may then help gauge the performance of the vehicle. This data may be provided in displays to the consumer informing the consumer if there is anything wrong, and may thus provide more than a mere luxury feature for the vehicle. While many of these amenities may be more readily available in luxury cars, it is more likely that at least some of these features will be more accessible in standard models in the future.

However, these features tend to be built in to the vehicle by the manufacturer, with little to no way of reconfiguring them by the typical consumer. Furthermore, even if some of these electronic features may be configurable by a consumer, each automobile manufacturer may have proprietary designs for constructing and operating these features, precluding a user from porting any of his or her custom designs over to another vehicle of a different manufacturer, or even to another vehicle of the same manufacturer. It may be desirable then to have a consumer be able to generate electronic interfaces with multiple vehicles by the same or different manufacturers using a common programming interface.

Figure 1:
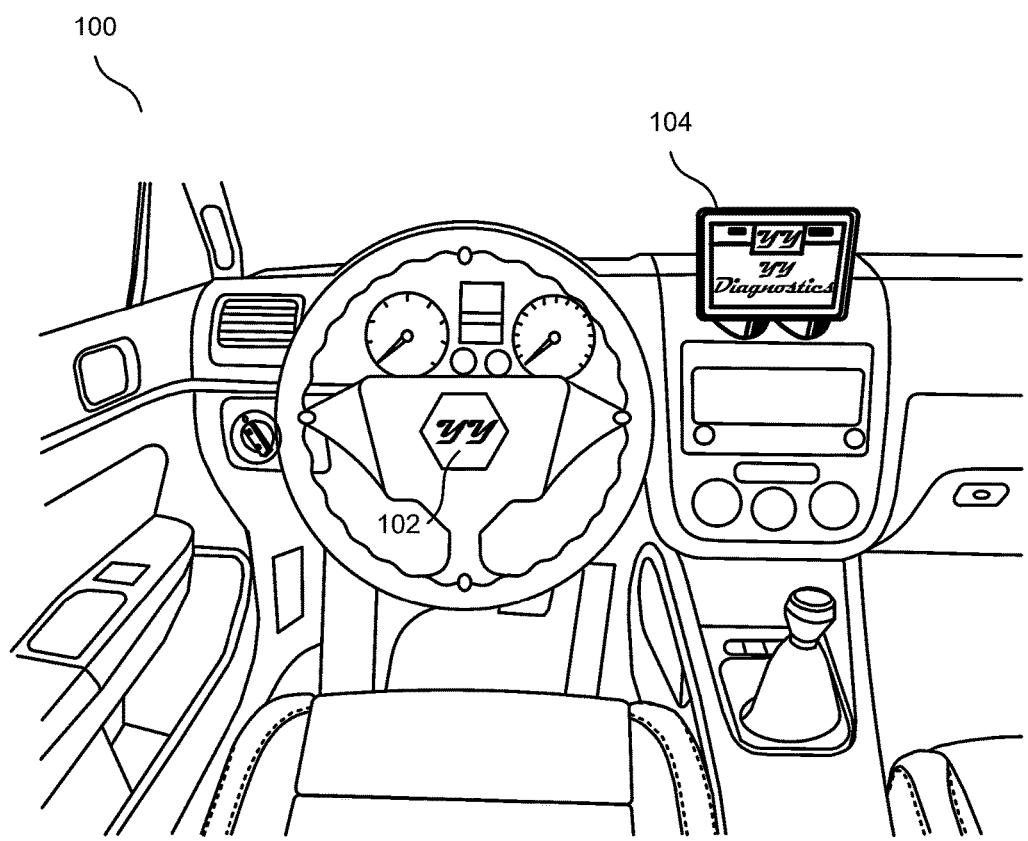
FIG. 1 illustrates an example automobile with a mobile device.

For example, referring to FIG. 1, as alluded to above, an automobile of one manufacturer (i.e. generic brand "yy" 102) may have electronic features and interfaces available to the consumer and accessible in the car cabin 100. Car cabin 100 may be the inside of a luxury model of brand yy 102, and may have available features such as a digital touch screen 104. The touch screen 104 may be configured to display various menus containing music, maps, nearby locations, and vehicle telemetry diagnostics. Some brands and models today may already have such features built in to the vehicle. Brand 102 may offer this luxury model 100 with digital display 104 built-in, having constructed the entire vehicle at one time in a factory. Often times, these "as is" models do not offer an ability to configure the features of the vehicle model.

Figure 2:
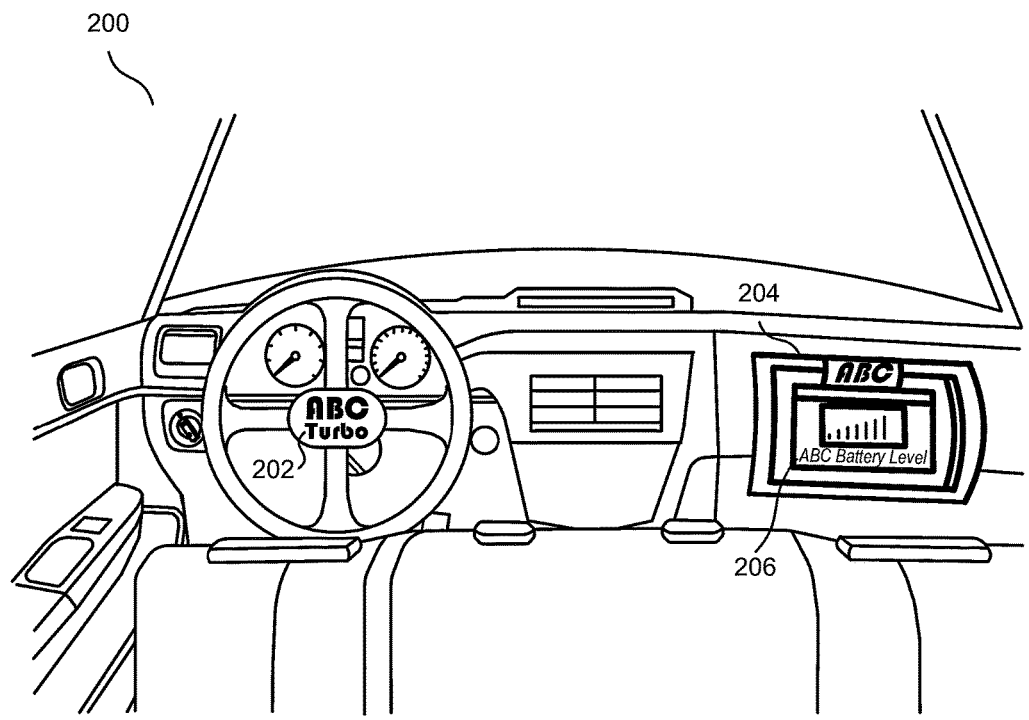
FIG. 2 illustrates a difference example automobile with a different mobile device.

Referring to FIG. 2, a different automobile than in FIG. 1, from a different manufacturer (i.e. generic brand "ABC Turbo" 202) may also have electronic features and interfaces available to the consumer and accessible in car cabin 200. The functionality and features available with brand 202 may be the same or different than what is available with brand 102. In this example, digital display 204 may be configured to display telemetry about vehicle 200, such as the battery level 206. Display 204 may be configured to convey other information, such as maps, music, and other vehicle telemetry. Vehicle 200 may be manufactured with display 204 built-in, and applications configured to be shown on display 204 may be pre-installed. Typically, this suggests that display 204 and the capabilities provided therein are not usable in vehicle 100, while display 102 and the capabilities provided therein are not usable in vehicle 200. Each vehicle manufacturer may design and build its cars in proprietary ways, discouraging a common application to be provided across multiple vehicles.

Figure 3A:
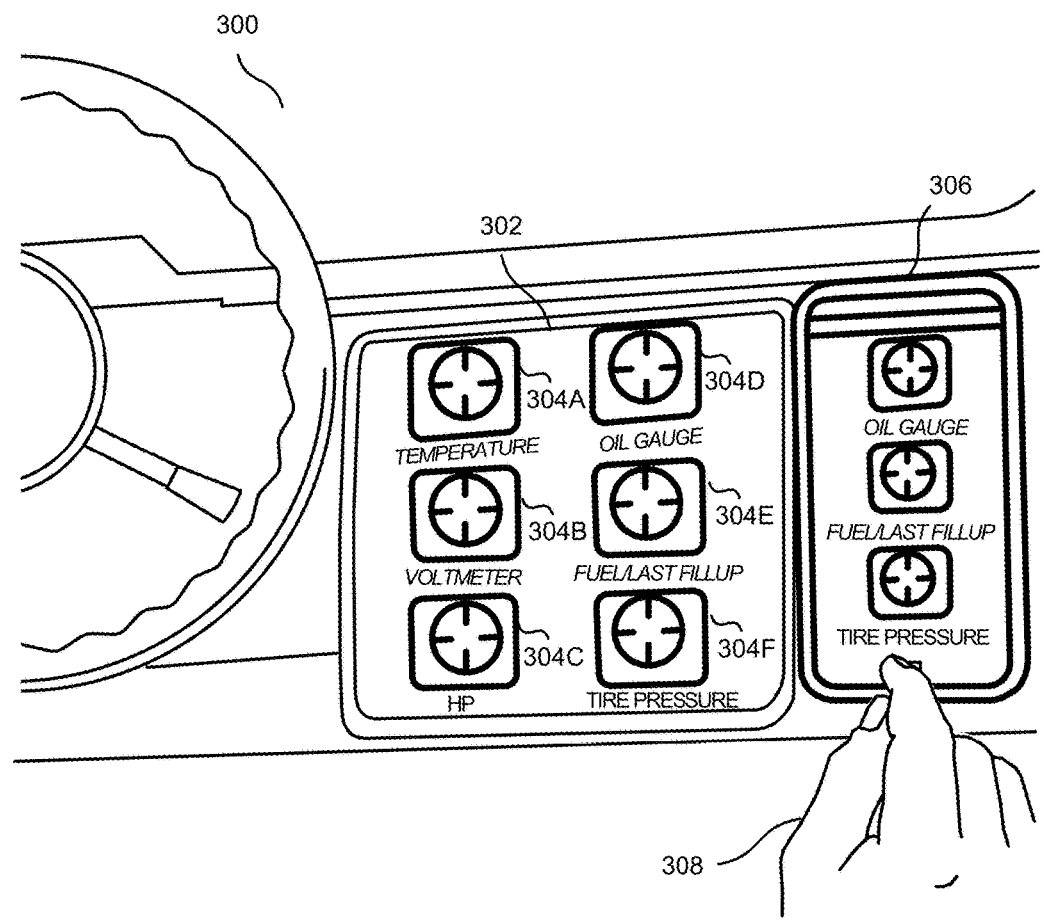
FIG. 3A illustrates an example interface of an embodiment in a first automobile.

However, referring to FIG. 3A, embodiments of the present invention may allow for multiple vehicles from multiple manufacturers to access functionality provided in each of multiple vehicles. Embodiments may be configured to program and design applications capable of accessing different sensors built in to a first vehicle 300 so that the different data may be detectible and viewable. Here the first vehicle 300 has built-in display 302 showing six readings 304A-304F from different areas of vehicle 300. For example, temperature reading 304A may indicate a temperature of the engine to determine whether the engine has proper coolant. Voltmeter reading 304B may indicate the voltage of the battery of vehicle 300. HP reading 304C may display a measured reading of current horsepower used by vehicle 300. Oil gauge reading 304D may indicate how much oil is present in vehicle 300. Fuel reading 304E may indicate how much fuel is available in vehicle 300, or alternatively when was the last time fuel was put into the vehicle 300. Tire pressure gauge 304F may display the tire pressure of at least one tire of vehicle 300. The sensors allowing viewable access to such data described herein may be pre-installed in vehicle 300. In other instances, sensors may be installed after manufacturer, by a mechanic or car dealer. Embodiments are not so limited. Vehicle telemetry data 304A-304F are merely examples, and persons having ordinary skill in the art may appreciate what other kinds of vehicle telemetry may be accessible and desirable.

Some embodiments may be installed on mobile device 306, allowing a consumer/driver 308 to design his or her own custom application, viewable on either mobile device 306 or in display 302 of vehicle 300, the application capable of displaying the vehicle telemetry 304A-304F as described above. Vehicle 300 may be configured to receive data from mobile device 306, through, for example, a docking station add-on in vehicle 300 or a USB port. Alternatively, vehicle 300 may be configured to install consumer-programmed applications generated by some embodiments. In other examples, vehicle 300 may be configured to accept and display data via wireless signals from an application remotely generated by some embodiments. Other means for displaying car telemetry on display 302 through applications generated by embodiments may be apparent to persons having ordinary skill in the art, and embodiments are not so limited.

Figure 3B:
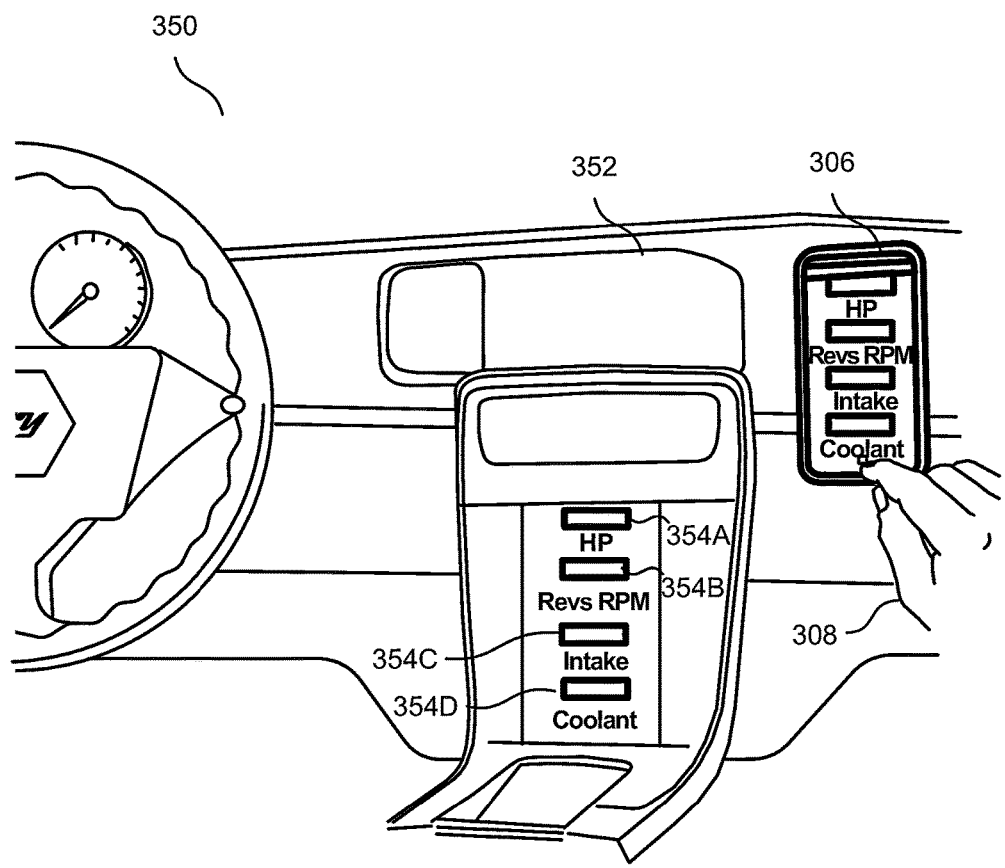
FIG. 3B illustrates an example interface of the embodiment in a second automobile.

Referring to FIG. 3B, embodiments may also generate applications for accessing vehicle telemetry of a second automobile from a second manufacturer. For example, vehicle 350 may be built by a second manufacturer different than the one that built vehicle 300. Nevertheless, embodiments may still be configured to generate applications configured to access the vehicle telemetry of vehicle 350. Here, display 352 may be configured to display an application generated by some embodiments. The application may contain readings 354A-354D from vehicle telemetry sensors found in various locations within vehicle 350. For example, HP display 354A may show a bar-like reading that fills in the higher the amount of horsepower is being used by vehicle 350. Revs RPM display 354B may illustrate a similar bar-like reading that fills in the higher the amount of revolutions per minute occur in vehicle 350. Intake bar 354C may reflect an amount of fuel the intake valves are consuming per unit time, and may be illustrated by a similar bar-like measurement. Coolant display 354D may reflect a bar-like measurement reading for how much coolant is present in vehicle 350. Of course, these readings 354A-354D are merely examples, and many other types of vehicle telemetry readings apparent to persons having ordinary skill in the art may be included in embodiments. Also, the car telemetry 354A-354D may be accessible in ways similar or different to those described in FIG. 3A, and embodiments are not so limited.

The display 352 in the second vehicle 350 may be generated by the same mobile device 306 as the mobile device used to establish the display 302 in vehicle 300. Typically, different car manufacturers may not share information to other car manufacturers, often times precluding devices or applications from being used across multiple cars of different car brands. However, embodiments may allow user 308 to generate applications on a common programmable platform using, for example, mobile device 306, the applications being displayable in multiple cars from different manufacturers, such as first vehicle 300 and second vehicle 350. Mobile device 306 may then connect to vehicle 350 or display 352 and thus display the application generated by some embodiments into the vehicle 350 itself. Mobile 306 may be connected to display 352 in a similar or different way than described in FIG. 3A, and embodiments are not so limited.

Figure 4:
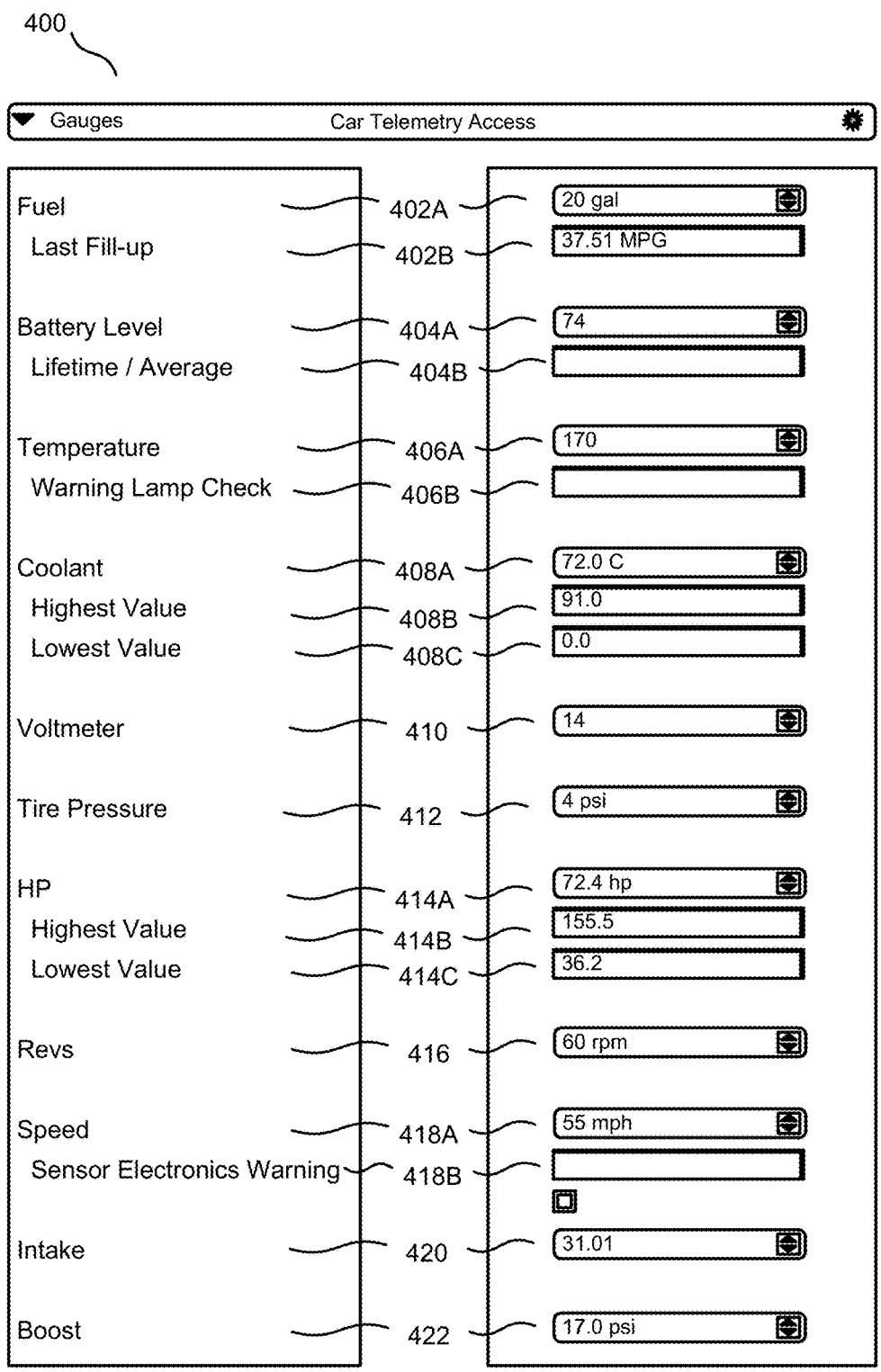
FIG. 4 illustrates an example application program interface (API) layer containing vehicle telemetry according to some embodiments.

Referring to FIG. 4, display 400 may illustrate an example application program interface (API) layer of some embodiments, used for generating applications like those for displaying car telemetry as described in FIGS. 3A and 3B. Embodiments may allow a consumer, e.g. consumer 308, to generate or program multiple applications capable of reading and displaying information based on inputs from multiple vehicles. Embodiments may therefore include a common programming platform, such as API layer 400, configured to generate at least one application for accessing car telemetry in more than one vehicle.

Here, API layer 400 may display a number of car telemetry accessible to a consumer/user. As merely some examples, display 402A may be configured to access and display an amount of fuel available in a vehicle, and display 402B may be configured to display a fuel efficiency rating of the performance of the vehicle of the last tank of fuel, expressed in miles per gallon (MPG). Display 404A may be configured to access and display a battery level, measured in volts or a proportion of maximum voltage potential. Display 404B may display a known average level of battery operation, calculated over time. Display 406A may display a temperature reading of a part of the vehicle, for example at the engine of the vehicle. Display 406B may change color or turn on if a warning lamp reading is enabled. Such a reading may signal to the user to take the vehicle in for maintenance or to check a certain aspect of the vehicle for potential signs of trouble.

In other examples, display 408A may show an amount of coolant based on a current temperature reading. The level of coolant may be deemed sufficient or insufficient based on the temperature reading. Displays 408B and 408C may show a highest and lowest value of the temperature reading, both of which may represent the highest and lowest values during a single car trip or during the recorded lifetime of the vehicle. A display 410 may show a voltage potential of a battery of the vehicle. Display 412 may illustrate the current level of tire pressure of at least one tire, expressed here in pounds per square inch (psi). Displays 414A-414C may show different levels of horsepower used in the vehicle, with displays 414B and 414C showing a highest and lower value for each. Display 416 may show the revolutions of the vehicle engine, measured for example in RPM. Display 418A may show a current speed of the vehicle, expressed here for example in miles per hour (mph). An electronics warning sensor 418B may be available to show a user if a current speed is above some predetermined threshold, such as above a set speed limit. Display 420 may show an amount of fuel or vapor entering intake valves of the vehicle. Display 422 may show an amount of fuel injected into the engine acting as a boost to normal acceleration of the vehicle.

These sensor readings of a vehicle may be available to a consumer/user for generating applications, according to some embodiments. A consumer/user may select any or all of these sensor options, embed the sensors in a graphical interface, and display the sensor readings in an application with additional graphics or functions. These sensors are again, merely examples, and persons having ordinary skill in the art may be able to readily ascertain many other sensors to read different metrics of a vehicle. Embodiments are not so limited.

Figure 5A:
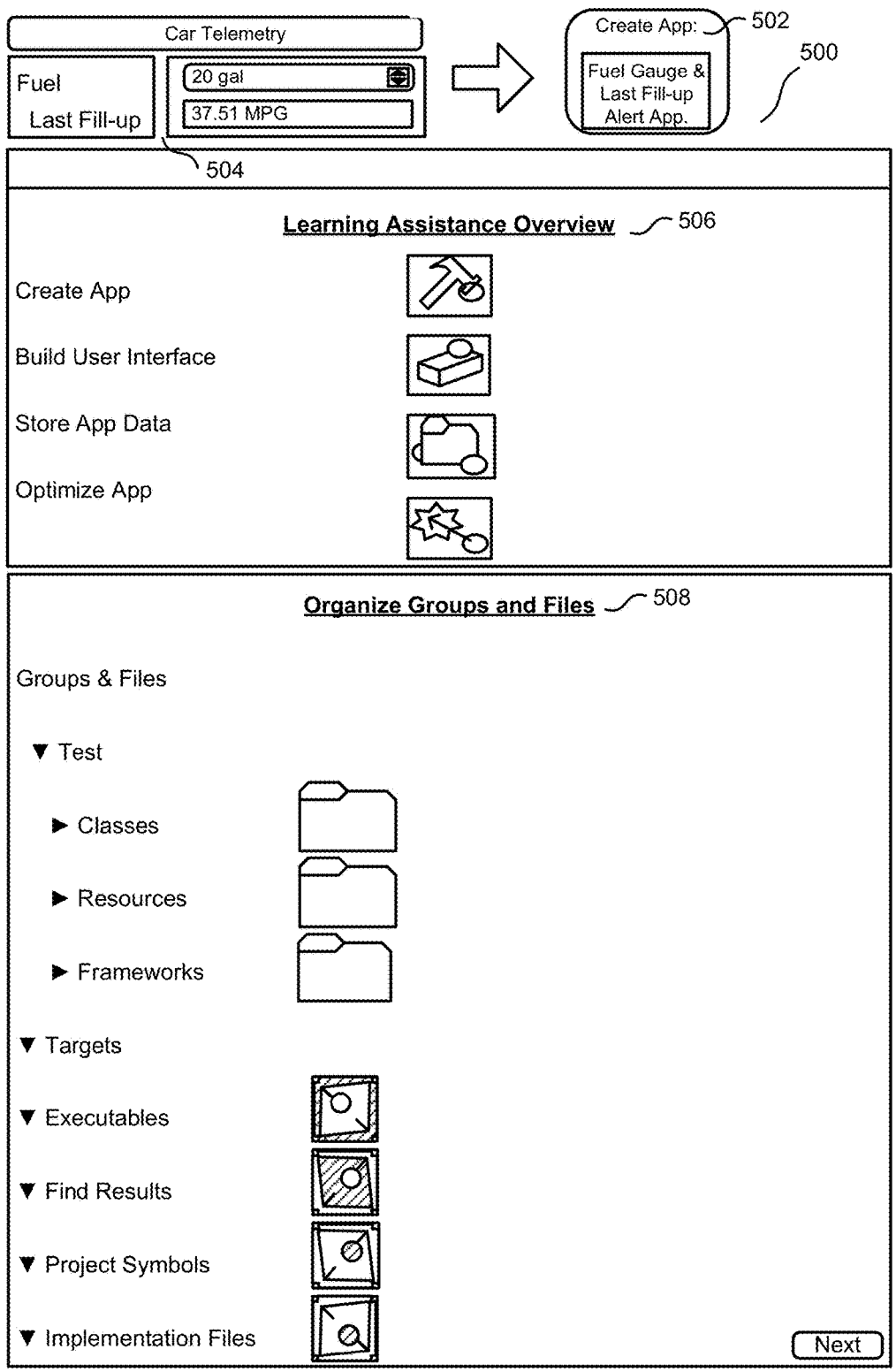
FIGS. 5A-5D illustrate an example process for creating applications using the API layer according to some embodiments.

Referring to FIG. 5A, a consumer/user may generate an application using the sensor readings as discussed in FIG. 4 and supported by a consumer-programmable application program interface (API) according to some embodiments. Display API page 500 may be an example first display for allowing a user to generate his or her own application for utilizing the sensor readings. API display 500 may be displayed on any number of devices, including personal computers, mobile devices, and the like. At the top of API display 500 as shown, a user may select a button to create an application, such as a Fuel Gauge & Last Fill-up Alert App 502. The user may wish to generate this application based on the vehicle telemetry 504 shown in the top left, including a current reading of fuel in a vehicle and statistics on the performance of the vehicle from the last fill-up.

At display menu 506 the user may then have several options for adjusting or creating the application, as shown. The user may start creating the application by selecting the "Create App" button. The user may build a user interface that may be connected to the application or may be a generic user interface by selecting the "Build User Interface" button. The user may store or save a set of live or test sample data by selecting the "Store App data" button. The user may also adjust, modify, and optimize the application by selecting the "Optimize App" button. Certainly, the options in menu 506 are merely examples, and the consumer-programmable API may contain a number of different menus or means for allowing applications to be programmed, and embodiments are not so limited.

At display menu 508, the user may have various options for organizing and grouping files for generating applications. For example, the user may be able to access test features for testing, debugging, and improving the generated applications under the "Test" tab, as shown. The user may be able to access various classes, resources, frameworks, or other data structures that may comprise an application. Other options may be available, including selecting a constraint or target amount of data in the application and/or selecting an executable that may be representative of an application. A user may also be able to search through test data and other data archives, select resources based on a common marker or symbol, and/or select various implementation files when generating or improving an application. Again, these are merely examples, and persons having ordinary skill in the art may devise many other types of options available to a consumer-programmable API according to embodiments.

Figure 5B:
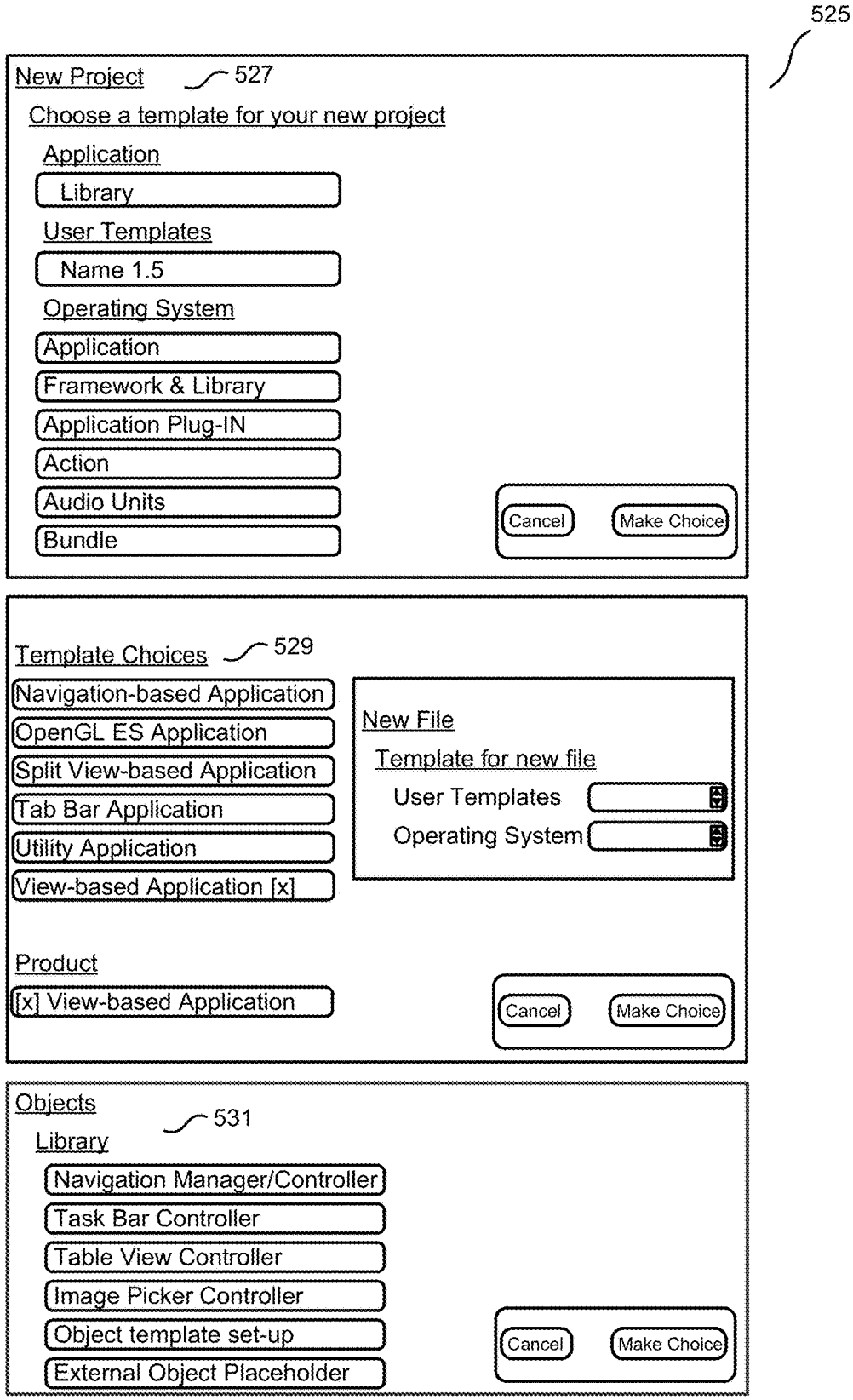

Referring to FIG. 5B, example graphical interface 525 may provide more options and windows for programming applications according to some embodiments. At menu 527, a user may have the option of creating a new project for generating an application. The project may contain one application or multiple applications, and may be accessible after selecting from one of the menus shown in FIG. 5A. In menu 527, the user may be able to name the project and select if the application should be designed using a template already provided. The user may also select other features for generating the application, such as a type of framework or library to be used, if the application should be a plug-in, a description of the type of action(s) the application may perform, a setting for type of audio packages for use in the application, or an option to select from some other preselected bundle. Selecting on these options may open new windows or menus so that a user may make different selections.

At menu 529, the user may move to this menu of template choices after having selected a button to enable selecting a template for generating the application. The user may select from a number of different categories that describe templates suitable for creating an application of a certain type, as shown. The user may also design his or her own application after creating a custom-designed template. Embodiments are not limited as to the types of templates available, or if templates are even available at all.

At menu 531, the user may also select a number of objects to be generated for use in the application. Objects may include tables, menus, icons, images, or other entities. Objects may be consistent with principles according to object-oriented programming, wherein the objects are programmed to perform various functions and are highly maneuverable and reconfigurable. The objects may be organized in a set of libraries, such as the example library shown in menu 531. Of course, embodiments may include other programming means for generating applications, such as a functions-oriented approach or a state machine approach. Many other means may be apparent to persons having ordinary skill in the art, and embodiments are not so limited.

Figure 5C:
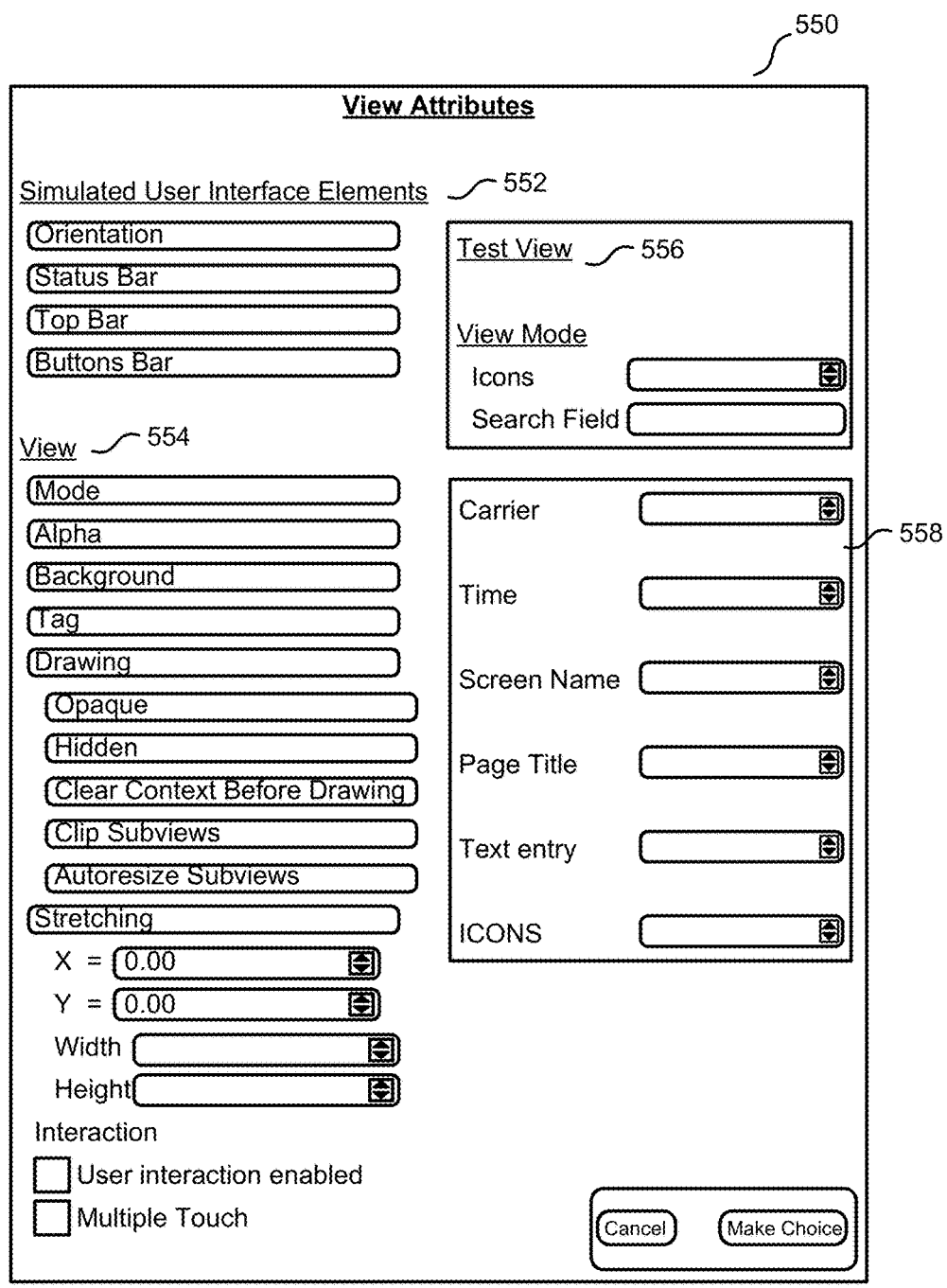

Referring to FIG. 5C, example graphical interface 550 may provide yet more options for programming applications according to some embodiments. Here, graphical interface 550 provides a menu for viewing and altering attributes of various features of an application. For example, sub-menu 552 may contain options for changing orientations of features and for adding, altering, or removing menus in various menu bars. Sub-menu 554 may allow the user to adjust other features, including changing colors, changing positions of features, raising or lowering features into the foreground or background, etc. Sub-menu 556 may provide options for viewing the application in a test view or some other view, so that the user can see better what the application may look like. Sub-menu 558 may allow the user to input other information, as shown.

Figure 5D:
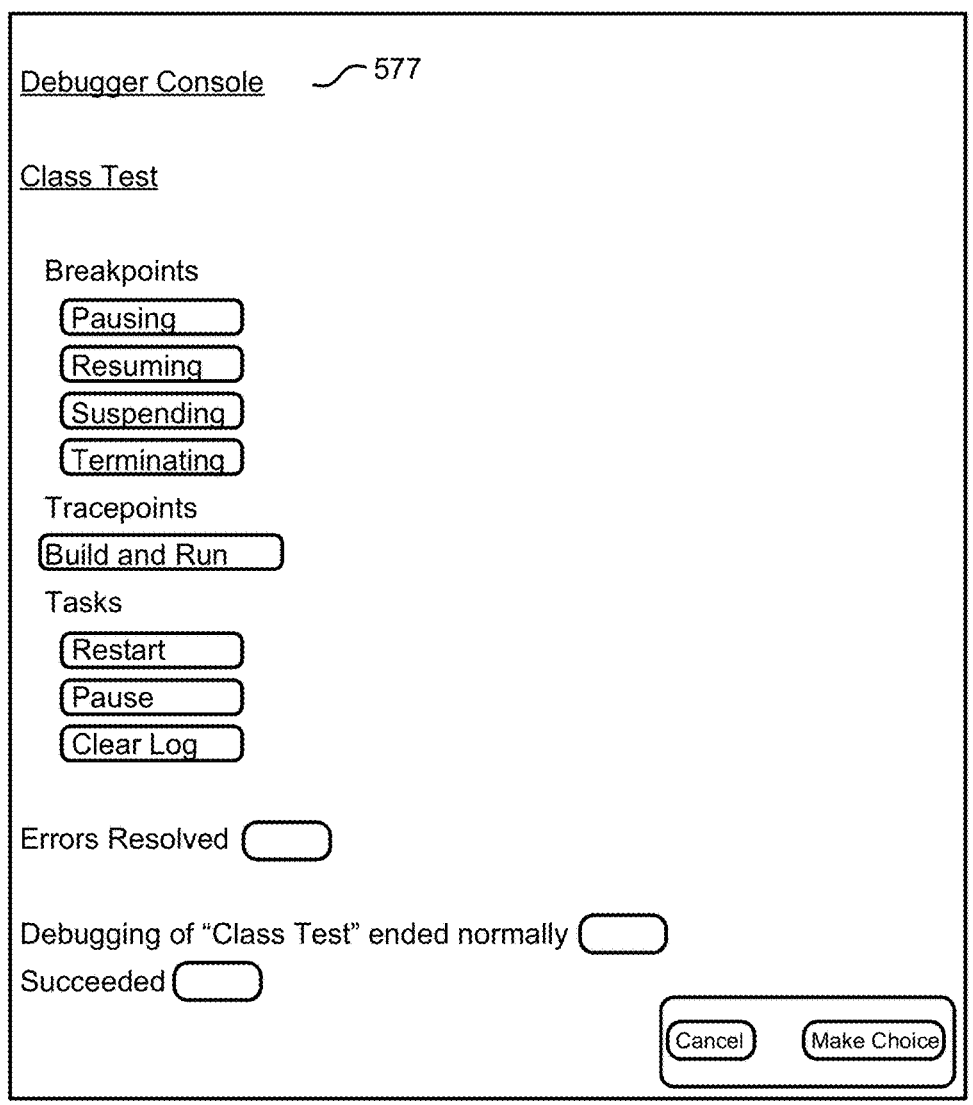

Referring to FIG. 5D, example debugging interface 575 may be another type of menu available to a user for generating applications accessing vehicle telemetry. Menu 577 may contain various options for testing the application to see if the application functions as intended. Debugging menus may allow the user to see a more detailed description of the functions and objects being accessed by the application based on inputs from a user or a vehicle. Here, the user may utilize test data as described previously, as example inputs for the application. Other debugging interfaces apparent to persons having ordinary skill in the art may be included in embodiments, and again these are merely just examples.

Referring to FIGS. 6A, 6B, 6C, and 6D, example sets of pseudocode may illustrate steps a computer and/or computer programmable medium may perform according to some embodiments. In FIG. 6A, example code is provided to show how a vehicle's rear parking/proximity sensor may be accessed. In FIG. 6B, example code is provided to show how a vehicle's engine telemetry may be accessed to detect when the vehicle is in motion. In this case, distracting functions or features available to the driver may be disabled, having determined that the user is now driving. In FIG. 6C, example code is provided to show how a vehicle's engine telemetry may be accessed to determine when the vehicle is low on fuel. Then, the Internet may be accessed, using wireless features on the mobile device, to search for a nearby fuel station. In FIG. 6D, example code is provided to show how a vehicle's eye tracking camera may be accessed. The application may detect that the driver is becoming fatigued and may record the event. Statistics may be generated to discern what patterns may be apparent if drivers are fatigued at certain times or after driving a certain amount of time. Example code as provided in FIG. 6D may be used to assist freight and transportation companies, for example, to monitor employees and improve safety. The example sets of code provided herein are merely examples, as other implementations may be apparent to persons of ordinary skill in the art. Embodiments are not so limited.

Figure 7A:
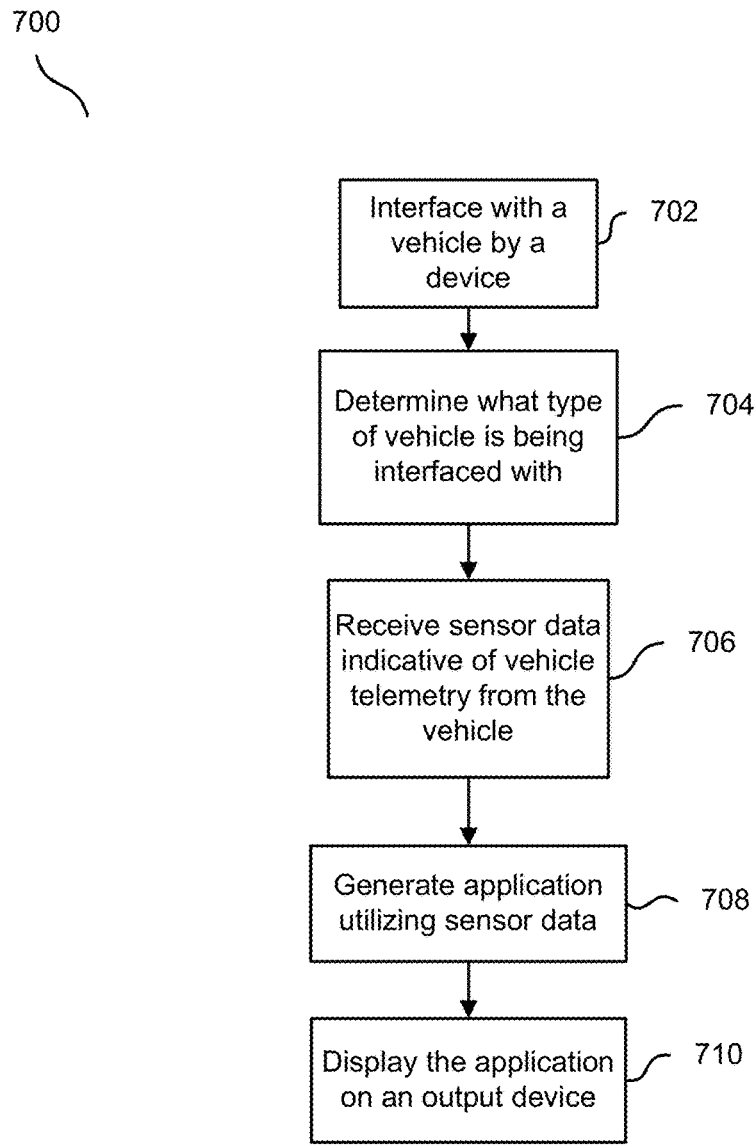
FIG. 7A is a flowchart showing an example method according to some embodiments.

Referring to FIG. 7A, an example flowchart 700 shows steps for performing some embodiments for generating at least one application capable of accessing car telemetry of multiple vehicles. Starting at block 702, some embodiments may interface with a vehicle by a device. The vehicle may be any of the vehicles described herein, or may be any other type of vehicle, and embodiments are not so limited. The device may be a mobile device, wired device, remote control, computer system, or any other type of device configurable to interface with the vehicle. Here, interfacing may mean being able to access data originating from the vehicle, and/or being able to interact with the vehicle in some way.

At block 704, some embodiments may determine what type of vehicle is being interfaced with. After interfacing with the vehicle, embodiments may be able to retrieve data about the vehicle that may determine the type of vehicle it is. The type of vehicle may refer to the brand, model, and/or make of the vehicle. In other instances, the type of vehicle may be based on the unique vehicle identification number (VIN) of the vehicle. Determining the type of vehicle may be important because embodiments may be able to access multiple types of vehicles, but such access may be dependent on the type of vehicle being accessed. Additionally, such a determination may not be common-place or ordinary in the art, because normally applications interfacing with vehicles are custom-designed to fit only one type of vehicle or a single manufacturer of vehicles.

At block 706, some embodiments may receive sensor data indicative of vehicle telemetry from the vehicle being interfaced with. The sensor data indicative of vehicle telemetry may be consistent with the types of data accessible from a vehicle as described in any of the figures herein. For example, sensor data may be any digital or analog reading of vehicle telemetry, examples of vehicle telemetry being a current number of revolutions per minute (RPM) of the vehicle engine, or a current speed of the vehicle expressed in MPH. Vehicle telemetry may also include other readings about the vehicle, such as diagnostic data about the vehicle engine, tires, lights, or other parts of the vehicle that may be require periodic maintenance. Many other examples are possible, and embodiments are not so limited.

At block 708, some embodiments may generate an application utilizing the sensor data of the vehicle. The application may perform any number of functions, including any of the functions described herein. Examples may include displaying in either numerical or graphical format current sensor readings from the vehicle, such as current temperature in the cabin, current tire pressure in the tires, etc. Other examples may include displaying a bar or line graph of current changes in vehicle telemetry readings, such as a change in speed of the vehicle over time. Generating such applications may be consistent with techniques described in any of the figures herein. Some embodiments may include a consumer-programmable platform, capable of generating multiple applications based on accessible vehicle telemetry, the applications capable of being used with vehicles from different manufacturers. The programmable platforms may be available on a device, such a mobile device or any other kind of device described herein.

At block 710, some embodiments may display the application on an output device. After the application is generated, the application may be ready for use in a display of an output device. The output device may be the same as the device interfacing with the vehicle, such as the same mobile device, or it could be a different device. For example, the vehicle itself could be the output device, in that a display in the vehicle may be configured to display the application, not unlike the examples described herein. In other cases, an additional display unit that is attached to the vehicle may display the application. In other cases, a test computer stationed in a lab outside of the vehicle may display the application, the application being used to monitor and test performance of the vehicle.

Figure 7B:
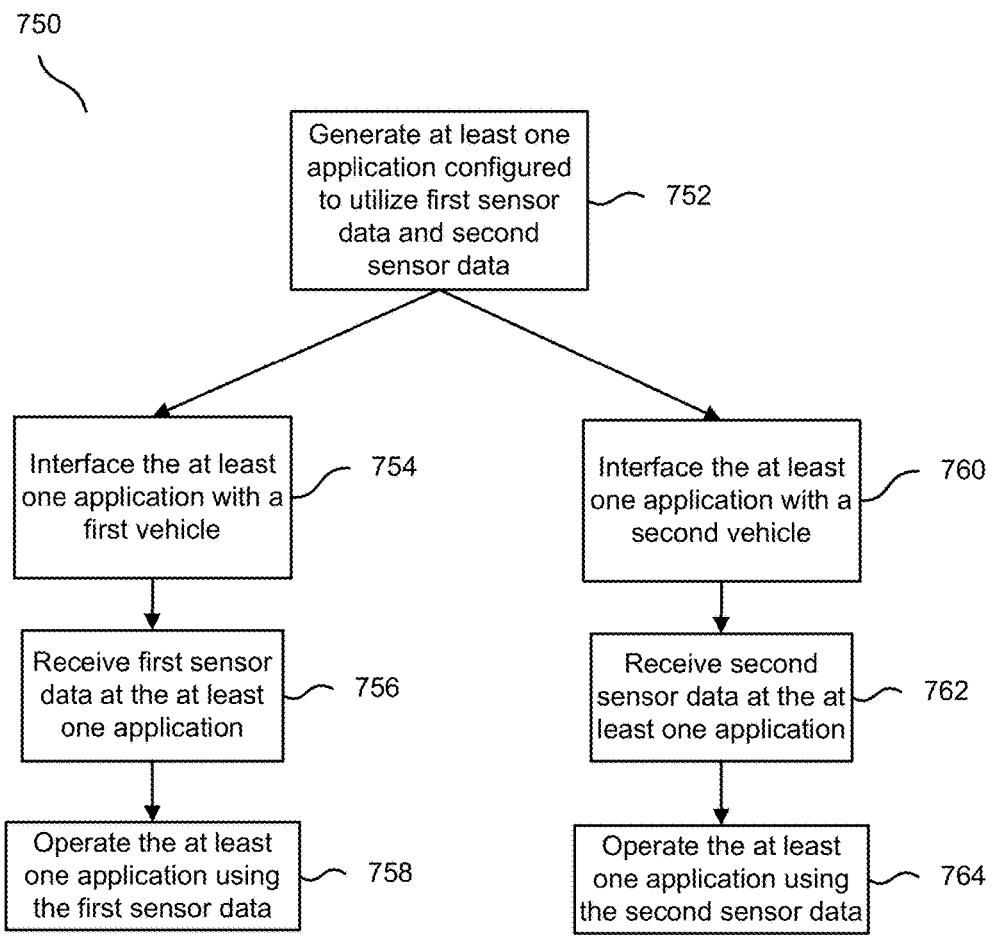
FIG. 7B is another flowchart showing an example method according to some embodiments.

Referring to FIG. 7B, example flowchart 750 shows steps for performing some embodiments involving more than one vehicle. As previously stated, embodiments may provide applications configured to access vehicle telemetry from more than one vehicle, the vehicles made from different manufacturers. Flowchart 750 illustrates an example method for operating an application on more than one vehicle according to some embodiments.

At block 752, some embodiments may generate at least one application configured to utilize first sensor data and second sensor data. The first sensor data may be data indicative of first vehicle telemetry from a first vehicle, and the second sensor data may be data indicative of second vehicle telemetry from a second vehicle. The first and second vehicles may be vehicles built by different manufacturers, or may be vehicles built by the same manufacturer. Generating the at least one application may be based on techniques previously described herein, using a consumer-programmable common platform interface. Utilizing the first and second sensor data may mean that the application is able to receive, access and/or use the first sensor data and second sensor data. The application may not actually use either of the data, but the application at least is still able to use the data if called upon to. Such a feature may be important because many applications may not be capable of accessing telemetry from different vehicles built by different manufacturers. Each manufacturer may have proprietary methods that are not available to applications of a different manufacturer. However, embodiments herein may be able to access telemetry from different manufacturers. Licenses may be achieved from the different manufacturers, or a common platform of configurable data may be designed into vehicles of different manufacturers. Standards may be put in place to create a uniform set of vehicle telemetry. Alternatively, certain manufacturers may form agreements with each other or with a common vendor to have sensors accessible to a common programming platform.

At block 754, the at least one application may interface with a first vehicle. The first vehicle may provide the first sensor data indicative of first vehicle telemetry. Interfacing with the vehicle may be achieved through any of the means described herein, or through other means apparent to persons having ordinary skill in the art. Embodiments are not so limited. For example, a mobile device having the application stored in memory may connect to the vehicle via an electronic interface via a cigarette lighter of the vehicle while inside the car cabin of the vehicle.

At block 756, some embodiments may receive the first sensor data at the at least one application. The first sensor data may originate from the first vehicle being interfaced with by the at least one application. The data may be received through any means described herein, or through other means apparent to persons having ordinary skill in the art. The first sensor data may be data consistent with any of the sensor data described herein, or of other types of data apparent to persons having ordinary skill in the art. Embodiments are not so limited.

At block 758, some embodiments may operate the at least one application using the first sensor data. The operation of the at least one application may be conducted according to any of the descriptions described herein, or according to other means apparent to persons having ordinary skill in the art. Embodiments are not so limited. For example, the application may be operated by displaying the application on an output device connected to a mobile device having the application stored in memory. A driver of the first vehicle may continue to operate the at least one application by selecting options from a series of menus of the at least one application, where depending on the selection, the at least one application accesses a first subset of the first sensor data from the first vehicle. If the driver of the first vehicle makes a different selection, the at least one application accesses a second subset of the first sensor data from the first vehicle. These menus and selections may be consistent with any of the descriptions as shown herein, or with other means apparent to persons having ordinary skill in the art. Embodiments are not so limited.

At blocks 760, 762, and 764, the same or similar steps described with respect to blocks 754, 756, and 758 may apply, except that the steps are performed with a second vehicle. The same at least one application used in the first vehicle may be operable in the second vehicle, and the second vehicle may be built by the same or a different manufacturer than the one who built the first vehicle. The at least one application may also be a different application, wherein embodiments may include a consumer-programmable common platform interface capable of generating both applications.

Figure 8A:
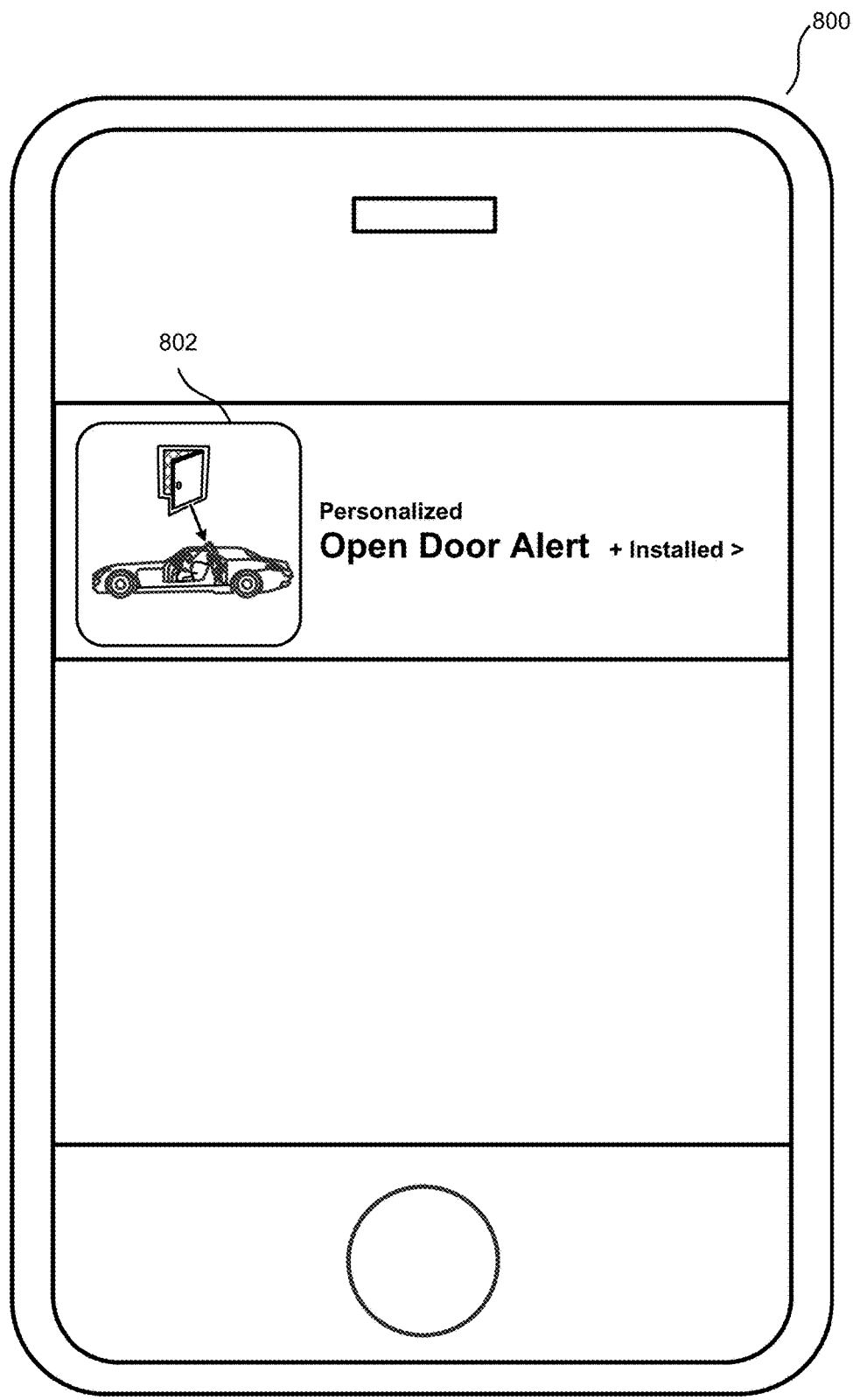
FIGS. 8A-8B illustrate various types of applications that may be created by some embodiments.

Referring to FIG. 8A, graphical interface 802 on mobile device 800 shows an example application that may be generated by some embodiments. An application 802 signaling to a user that a door of a vehicle is open may be generated by some embodiments using available car telemetry of a vehicle. The application 802 may access one sensor near a door that is enabled whenever the door does not touch the sensor. The sensor may be placed in other locations of the vehicle, and may be enabled to determine the door is open through other means, and embodiments are not so limited. Application 802 may be generated to be used in more than one vehicle, particularly in vehicles built by different manufacturers. Embodiments may be configured to access different sensors of different manufacturers that convey the same or similar type of data. Alternatively, applications generated by some embodiments may be programmed to detect different types of sensors, depending on the type of vehicle the application is applied to.

Figure 8B:
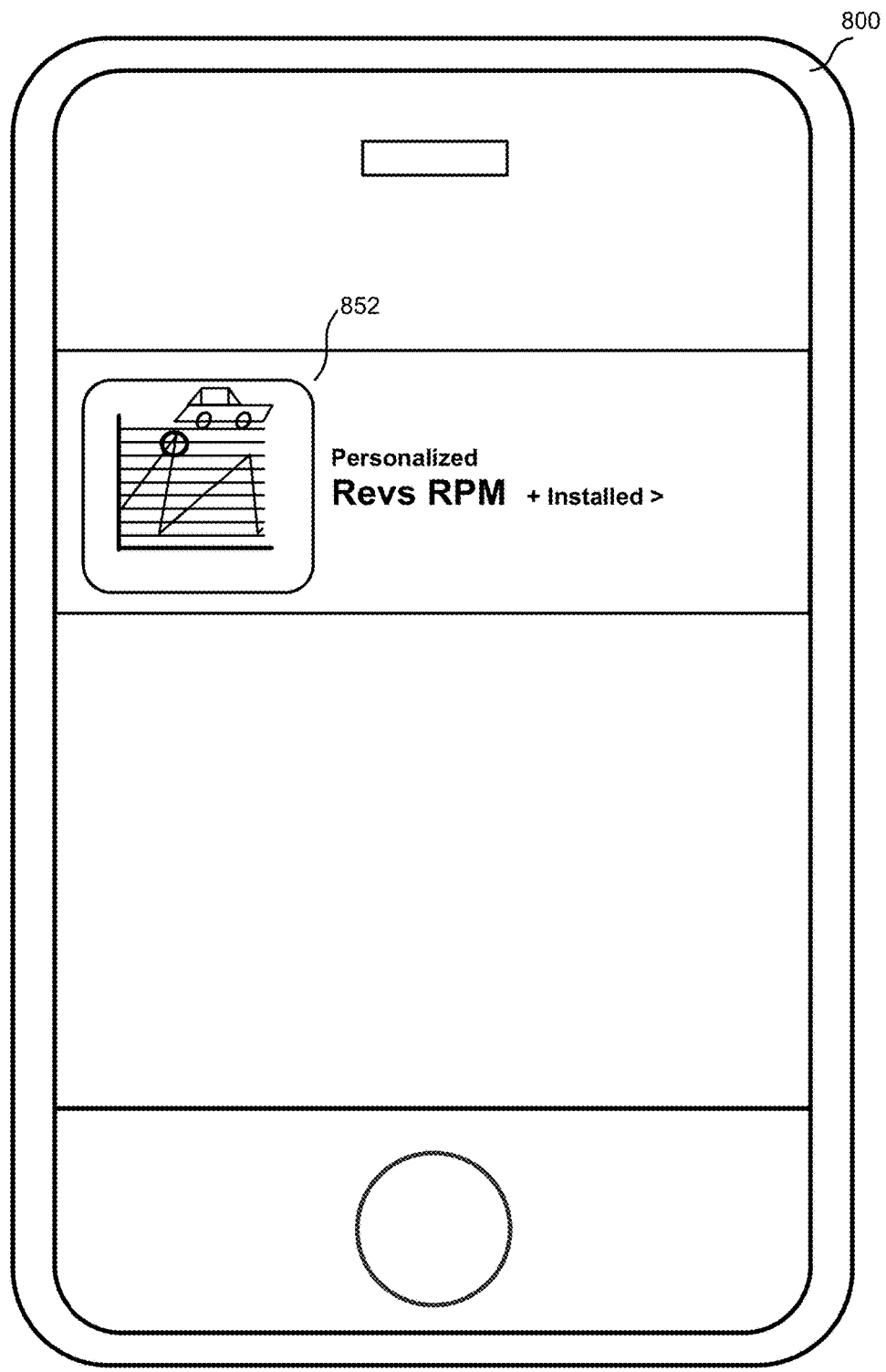

Referring to FIG. 8B, a different graphical interface 852 on mobile device 800 shows another example application that may be generated by some embodiments. Application 852 may display a plot over time of RPM of the vehicle. Application 852, being generated by some embodiments, may access a sensor of the vehicle configured to output the RPM of the vehicle. Application 852 may then plot the readings from the sensor and display them as a plot over unit time, resulting in a graphical plot as shown.

Referring to FIG. 9, example graphical interfaces may be generated by some embodiments and then used by a consumer/user, the graphical interfaces containing data and information as shown in graphical interfaces 920 and 940. For example, the consumer/user may view the start of an application for a Personalized Revs display, consistent with the display in FIG. 8B, at display 910. The consumer/user may then click or press on the graphic of display 910 to open the application. Alternatively, the user may operate application 910/920 by saying a voice command, programmable by some embodiments. Other similar methods for operating applications generated by embodiments may be apparent to persons having ordinary skill in the art, and embodiments are not so limited.

Having opened the application to reveal the display 920, the consumer/user may be able to see this particular application at work. For example, the cursor 922 may travel along the plotted line 924 according to the current level of RPM of the vehicle. Application 910/920 may require real-time access to vehicle telemetry in order to operate fully, and accessing such telemetry may be achievable through means previously described herein. Application 910/920 may also contain other displays or functionality based on other vehicle telemetry, consistent with any means described herein.

Similarly, graphical interface 930 may be clicked on or touched to open an application that may look like graphical interface 940. In other cases, interface 930 may be voice activated, and may be configured to open the application after receiving a specific voice command. This application for a Personalized Open Door Alert display may be consistent with the display in FIG. 8A, at graphical interface 930. After opening the application 930/940, the consumer/user may have access to multiple pieces of information. For example, the consumer/user may receive an alarm or signal 942 if the application 930/940 detects that a door is open. In addition, the consumer/user may be able to read the degree of opening of a car door at message 944, or if a car lock is malfunctioning, at message 946. These kinds of information may be available based on vehicle telemetry, where methods for accessing such telemetry may be achieved in any of the methods described herein. Moreover, these applications are merely examples, and persons having ordinary skill in the art may be readily able to conceive of other applications or uses based on embodiments described herein.

In some embodiments, various other applications may be generated. For example, an application may provide a calendar service that sends automatic notices to a third party company or business at an appropriate time near a calendar date. The application may send vehicle telemetry information to the third party company or business that may be relevant to the calendar date. For example, a snapshot of various health and status data from the vehicle may be recorded by the application using vehicle telemetry, stored in the mobile device, and then the application may send the health and status data to a car dealer or mechanic that the user frequents. Alternatively, the application may simply record a series of snapshots of the health and status data, wherein the series of data may be analyzed by a car dealer or mechanic when it is time to service the vehicle.

In another example, an application utilizing a calendar function may send an automatic status update to an email address or phone number of a person or business the user has a meeting with. The application may determine that, based on the current location of the vehicle, the current time, the intended destination and the intended time, that it is not likely the user will make the appointment on time, a text or some message may be sent to the person or place of meeting. This may allow the user to focus more on driving, rather than make a phone call or send a text message while driving.

In another example, an application utilizing a calendar function may auto-generate reminders as a "to do list" in the mobile device, related to the vehicle. For example, the application may determine times or events when to get an oil change, when to refill on gasoline, when to check tire pressure, etc. The determinations may be made by periodically checking the statuses of various resources in the vehicle, e.g. fuel, tire pressure, mileage, etc. In other cases, regular intervals may be set, sometimes as recommended by the manufacturer or mechanic.

In another example, an application may automatically direct the user to a nearby gas station when the application detects the vehicle is low on fuel. The application may access the Internet via the mobile device to search for nearby gas stations as well as prices and/or retailers (e.g. Shell, Exxon, etc.), and may make determine a route to an optimal gas station using any user preferences for prices and retailers.

In some embodiments, an application may be generated to send a text or other message to the user if the vehicle is vandalized or damages while the user is away from the vehicle. For example, vandals may break the windows of the vehicle while the vehicle is parked on a street and the user is away, unable to hear any car alarms. Telemetry may be available that can provide an alert that the windows are broken, in the same way that a car alarm may determine that the windows are broken. Then, the application may send a text or some other message, to the user and even to a local police agency. The mobile device using the application may have remote access to the vehicle telemetry. Alternatively, the mobile device using the application may be attached to the vehicle and may send alerts to other mobile devices, either owned by the user or to an emergency contact of the user.

In some embodiments, an application may send relevant information to an emergency agency or other emergency contact if the application detects the vehicle is involved in an accident, using the vehicle telemetry as indicators. For example, some of the vehicle telemetry may suddenly be unreadable or disabled. Only certain portions of the vehicle telemetry, e.g. telemetry from the two front tires, telemetry from the two front headlights, may be disabled, suggesting that the front of the vehicle is damaged. In other cases, telemetry sensors on the body of the vehicle may indicate whether a crash has happened, for example, by the application suddenly not detecting any reading from certain telemetry sensors. After having determined a crash, the application may send an auto-generated message to emergency authorities containing relevant information about the user. This may be obtained by information stored in the mobile device, since it may be likely that the mobile device using the application is owned by the user operating the vehicle. This same contact information may be sent to relatives, next of kin, or other emergency contacts as well.

In some embodiments, an application may direct the vehicle to adjust settings of the vehicle, depending on the geographical and/or environmental conditions of the vehicle. In other words, the vehicle may become "context aware," according to some embodiments. For example, using the geo-positioning functions of the mobile device, the application may first identify the geo-positioning location of the vehicle, then adjust settings such as headlight alignment, daytime running lights, etc., depending on the local road conditions of the vehicle. In other cases, other settings may need to be adjusted to account for different laws, depending on the location identified according to some embodiments. Other context-aware circumstances may include automatically adjusting the clock of the vehicle as the vehicle drives along time zones, for example.

In some embodiments, an application may provide a caravanning or "tag along" function to other vehicles. The application may identify other vehicles of friends or a leader of a caravan using the vehicle telemetry and/or GPS sensors provided in the other vehicles. The application may then provide a dynamically changing navigation route to the caravanning leader or other vehicle. In this way, line of sight may no longer be necessary for caravanning purposes, which may be a limitation on normal techniques, such as via walk-e-talkie or other radio mechanisms.

In some embodiments, an application may use eye tracking sensors or other vehicle telemetry to monitor a driver's cognitive load. The application may send an alert, sound an alarm of sorts, and/or reduce distractions if it is determined that the driver is sleepy, tired, distracted, busy, etc. For example, phone calls may automatically switched to silent mode or go directly to voicemail. In other cases, a series of noises may be played if it is determined the driver is getting sleepy. Other vehicle telemetry may determine if the vehicle is veering or swerving, and the application may play noises or sound an alarm accordingly. In other cases, the voice features of a satellite navigation system may be adjusted to become louder or quieter depending if it is determined that the driver is too busy or distracted.

In some embodiments, an application may adjust car settings of multiple vehicles using the car telemetry provided in each vehicle, according to personalized settings of a driver. For example, the driver may use the application in a rental car and may reconfigure the seat, mirrors, cabin temperature, etc., that may be consistent with settings in a vehicle owned by the driver. In another example, the application may limit the power or top speed of a vehicle for certain drivers until it is determined the driver meets a certain level of competence. For example, a driving instructor may place the mobile device in a docking station in the vehicle, and the vehicle may have settings configured to limit the power or top speed.

The examples mentioned herein are merely illustrative, and may demonstrate just several of many possible uses according embodiments of the present invention. As can be seen, each application of the mobile device may be configured to utilize vehicle telemetry and may be used in multiple vehicles.

Advantages include, but are not limited to, providing an API programming platform common to a plurality of manufacturers, enabling vehicle manufacturers and users alike to program consumer devices using a uniform programming platform. Additionally, the user may access features of a vehicle more safely, by incorporating voice-activated features of a mobile device into the programmed applications. Furthermore, accessing external devices remotely via the mobile device may be more convenient for users.

Figure 10:
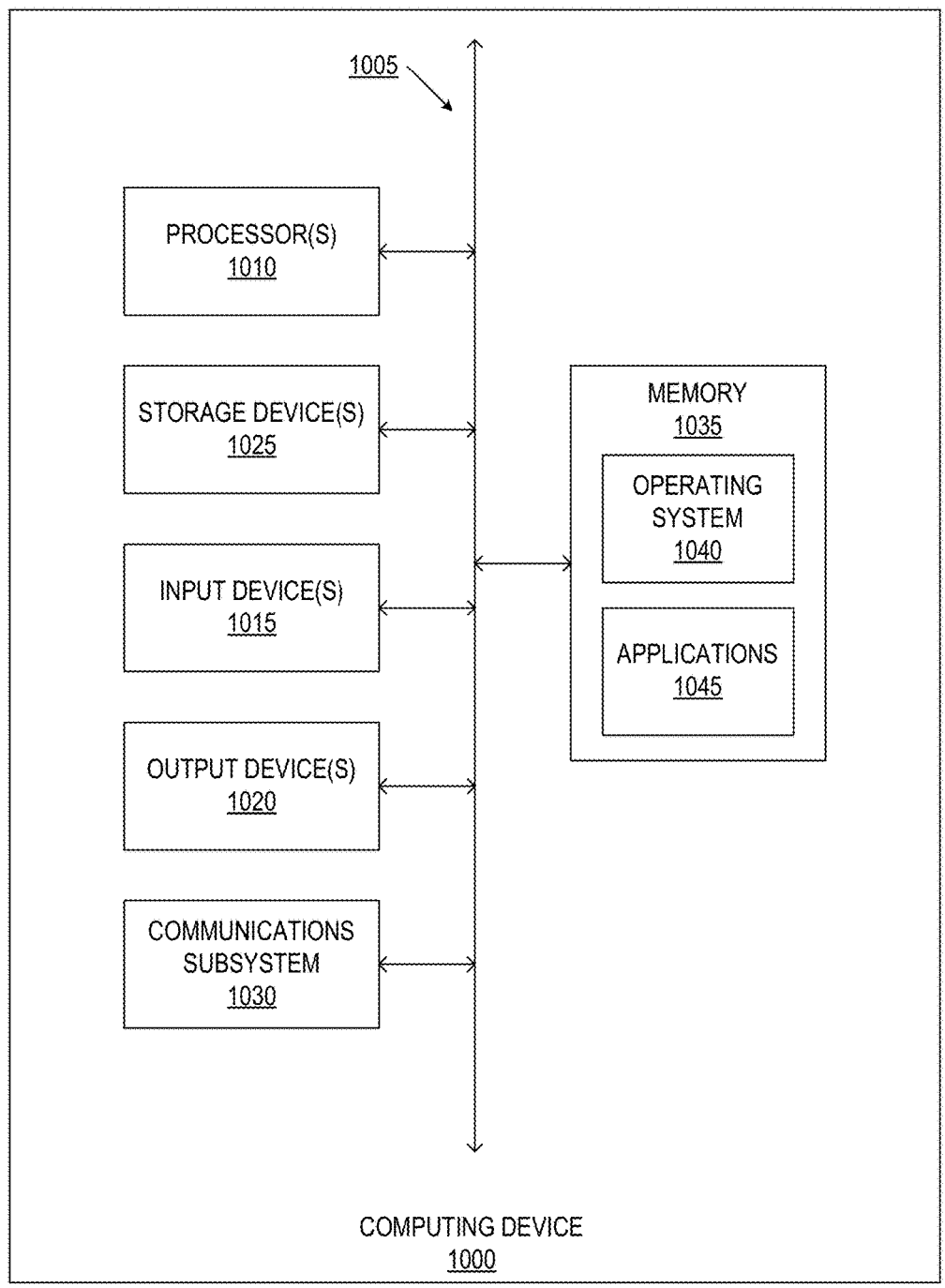
FIG. 10 illustrates an example computer system of some embodiments.

Having described multiple aspects of a common programmable platform for interfacing with vehicle telemetry in vehicles from multiple manufacturers, an example of a computing system in which various aspects of the disclosure may be implemented will now be described with respect to FIG. 10. According to one or more aspects, a computer system as illustrated in FIG. 10 may be incorporated as part of a computing device, which may implement, perform, and/or execute any and/or all of the features, methods, and/or method steps described herein. For example, computer system 1000 may represent some of the components of a hand-held device. A hand-held device may be any computing device with an input sensory unit, such as a USB port and/or a display unit. Examples of a hand-held device include but are not limited to video game consoles, tablets, smart phones, televisions, and mobile devices. In one embodiment, the system 1000 is configured to implement any of the methods described above. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, a set-top box, and/or a computer system. FIG. 10 is meant only to provide a generalized illustration of various components, any and/or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a camera, wireless receivers, wireless sensors, a mouse, a keyboard and/or the like; and one or more output devices 1020, which can include without limitation a display unit, a printer and/or the like. In some embodiments, the one or more processor 1010 may be configured to perform a subset or all of the functions described above with respect to FIGS. 3A, 3B, 4, 5A, 5B, 5C, 5D, 6A, 6B, 6C, 6D, 7A, 7B, 8A, 8B, and 9. The processor 1010 may comprise a general processor and/or and application processor, for example. In some embodiments, the processor is integrated into an element that processes visual tracking device inputs and wireless sensor inputs.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 7A and 7B, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. The processor 1010, memory 1035, operating system 1040, and/or application programs 1045 may comprise a programmable platform, as discussed above, and/or may be used to implement any or all of blocks described with respect to FIGS. 7A and 7B.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein, for example methods described with respect to FIGS. 7A and 7B.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025.

Volatile media include, without limitation, dynamic memory, such as the working memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods described in FIGS. 7A and 7B may be implemented by various blocks in FIG. 10. For example, processor 1010 may be configured to perform any of the functions of blocks in diagram 800, blocks in diagram 1000, blocks in diagram 1300 and blocks in diagram 1500. Storage device 1025 may be configured to store an intermediate result, such as a recorded object or image used for tracking purposes within any of blocks mentioned herein. The memory 1035 may similarly be configured to record an image or object necessary to perform any of the functions described in any of the blocks mentioned herein. Results that may need to be stored in a temporary or volatile memory, such as RAM, may also be included in memory 1035, and may include any intermediate result similar to what may be stored in storage device 1025. Input device 1015 may be configured to accept an input from a vehicle, sensor ports, or other peripheral described in any of FIGS. 1-9. Output device 1020 may be configured to output or display applications as described in any of FIGS. 1-9, and/or a tracking result that is an output of block 1050.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for augmenting data by a mobile device, comprising:
   receiving, at the mobile device, a first set of data from a first vehicle, the first set of data being indicative of vehicle telemetry information based on readings from one or more sensors disposed in the first vehicle;
   obtaining a second set of data associated with the mobile device, wherein the second set of data comprises a location of the mobile device determined by geo-positioning functions of the mobile device;
   determining local road conditions associated with the first vehicle based at least in part on the second set of data associated with the mobile device; and
   determining at least one command based on a vehicle context, the vehicle context determined by the mobile device based at least in part on the first set of data received from the first vehicle, the second set of data associated with the mobile device, and the determined local road conditions associated with the first vehicle.

2. The method of claim 1, wherein the second set of data is obtained from one or more sensors disposed in the mobile device.

3. The method of claim 1, wherein the second set of data is obtained from one or more software applications running on the mobile device.

4. The method of claim 1, wherein the at least one command corresponds to adjusting one or more settings of the first vehicle.

5. The method of claim 4, further comprising:
   transmitting the at least one command to the first vehicle.

6. The method of claim 1, wherein the at least one command corresponds to sending an alert to a user of the mobile device.

7. The method of claim 1, wherein the at least one command corresponds to performing an action by a software application on the mobile device.

8. The method of claim 1, further comprising:
   obtaining a third set of data from a second vehicle, the third set of data being indicative of vehicle telemetry information based on readings from one or more sensors disposed in the second vehicle; and
   determining the at least one command based further on the third set of data.

9. The method of claim 1, wherein the at least one command is determined in a software application running on the mobile device.

10. An apparatus for augmenting data, comprising:
    at least one processor configured to:
       receive a first set of data from a first vehicle, the first set of data being indicative of vehicle telemetry information based on readings from one or more sensors disposed in the first vehicle,
       obtain a second set of data associated with the apparatus, wherein the second set of data comprises a location of the apparatus determined by geo-positioning functions of the apparatus,
       determine local road conditions associated with the first vehicle based at least in part on the second set of data associated with the apparatus; and
       determine at least one command based on a vehicle context, the vehicle context determined by the apparatus based at least in part on the first set of data received from the first vehicle, and the second set of data associated with the apparatus, and the determined local road conditions associated with the first vehicle; and
    a memory coupled to the at least one processor.

11. The apparatus of claim 10, wherein the second set of data is obtained from one or more sensors disposed in the apparatus.

12. The apparatus of claim 10, wherein the second set of data is obtained from one or more software applications running on the apparatus.

13. The apparatus of claim 10, wherein the at least one command corresponds to adjusting one or more settings of the first vehicle.

14. The apparatus of claim 13, wherein the at least one processor is further configured to:
    transmit the at least one command to the first vehicle.

15. The apparatus of claim 10, wherein the at least one command corresponds to sending an alert to a user of the apparatus.

16. The apparatus of claim 10, wherein the at least one command corresponds to performing an action by a software application on the apparatus.

17. The apparatus of claim 10, wherein the at least one processor is further configured to:
    obtain a third set of data from a second vehicle, the third set of data being indicative of vehicle telemetry information based on readings from one or more sensors disposed in the second vehicle; and
    determine the at least one command based further on the third set of data.

18. The apparatus of claim 10, wherein the at least one command is determined in a software application running on the apparatus.

19. An apparatus for augmenting data, comprising:
    means for receiving a first set of data from a first vehicle, the first set of data being indicative of vehicle telemetry information based on readings from one or more sensors disposed in the first vehicle;
    means for obtaining a second set of data associated with the apparatus, wherein the second set of data comprises a location of the apparatus determined by geo-positioning functions of the apparatus;
    means for determining local road conditions associated with a vehicle based at least in part on the second set of data associated with the apparatus; and
    means for determining at least one command based on a vehicle context, the vehicle context determined by the apparatus based at least in part on the first set of data received from the first vehicle, the second set of data associated with the apparatus, and the determined local road conditions associated with the vehicle.

20. The apparatus of claim 19, wherein the second set of data is obtained from one or more sensors disposed in the apparatus.

21. The apparatus of claim 19, wherein the second set of data is obtained from one or more software applications running on the apparatus.

22. The apparatus of claim 19, wherein the at least one command corresponds to adjusting one or more settings of the first vehicle.

23. The apparatus of claim 22, further comprising:
    means for transmitting the at least one command to the first vehicle.

24. The apparatus of claim 19, wherein the at least one command corresponds to performing an action by a software application on the apparatus.

25. The apparatus of claim 19, further comprising:
    means for obtaining a third set of data from a second vehicle, the third set of data being indicative of vehicle telemetry information based on readings from one or more sensors disposed in the second vehicle; and
    means for determining the at least one command based further on the third set of data.

26. The apparatus of claim 19, wherein the at least one command is determined in a software application running on the apparatus.

27. A non-transitory processor-readable medium for augmenting data by a mobile device, comprising processor-readable instructions configured to cause a processor to:
    receive, at the mobile device, a first set of data from a first vehicle, the first set of data being indicative of vehicle telemetry information based on readings from one or more sensors disposed in the first vehicle;
    obtain a second set of data associated with the mobile device, wherein the second set of data comprises a location of the mobile device determined by geo-positioning functions of the mobile device;
    determine local road conditions associated with a vehicle based at least in part on the second set of data associated with the mobile device; and
    determine at least one command based on a vehicle context, the vehicle context determined by the mobile device based at least in part on the first set of data received from the first vehicle, the second set of data associated with the mobile device, and the determined local road conditions associated with the vehicle.

28. The non-transitory processor-readable medium of claim 27, wherein the second set of data is obtained from one or more sensors disposed in the mobile device.

29. The non-transitory processor-readable medium of claim 27, wherein the at least one command corresponds to adjusting one or more settings of the first vehicle.

30. The non-transitory processor-readable medium of claim 27, wherein the instructions are further configured to cause the processor to:
    obtain a third set of data from a second vehicle, the third set of data being indicative of vehicle telemetry information based on readings from one or more sensors disposed in the second vehicle; and
    determine the at least one command based further on the third set of data.

* * * * *